United States Patent [19]
Baugh

[11] Patent Number: 5,774,505
[45] Date of Patent: Jun. 30, 1998

[54] INTERSYMBOL INTERFERENCE CANCELLATION WITH REDUCED COMPLEXITY

[75] Inventor: Richard A. Baugh, Palo Alto, Calif.

[73] Assignee: Hewlett-Packard Company, Palo Alto, Calif.

[21] Appl. No.: 628,173

[22] Filed: Apr. 4, 1996

[51] Int. Cl.$^6$ .............................. H03K 5/12; H04B 3/14; G11B 5/09

[52] U.S. Cl. .......................... 375/348; 375/233; 375/290; 360/46; 360/65

[58] Field of Search ..................................... 375/233, 254, 375/290, 346, 348; 370/286, 289, 290; 379/410; 360/46, 65

[56] References Cited

U.S. PATENT DOCUMENTS

| | | | |
|---|---|---|---|
| 4,283,788 | 8/1981 | Tamburelli | 375/232 |
| 4,870,657 | 9/1989 | Bergamns et al. | 375/233 |
| 4,953,041 | 8/1990 | Huber | 360/46 |
| 5,107,379 | 4/1992 | Huber | 360/46 |
| 5,153,875 | 10/1992 | Takatori | 370/290 |
| 5,168,395 | 12/1992 | Klaassen et al. | 360/46 |
| 5,337,264 | 8/1994 | Levien | 364/724.01 |
| 5,355,258 | 10/1994 | Nakamura | 360/46 |
| 5,532,885 | 7/1996 | Okamura | 360/46 |
| 5,598,302 | 1/1997 | Park | 360/65 |

FOREIGN PATENT DOCUMENTS

| | | | |
|---|---|---|---|
| 0644677A1 | 3/1995 | European Pat. Off. | H04L 25/03 |

OTHER PUBLICATIONS

*Principles of Data Communication*, McGraw–Hill, Inc., 1968, pp. 186–187.

Bergmans, Jan W.M., "Decision Feedback Equalization for Digital Magnetic Recording Systems," *IEEE Transactions on Magnetics*, vol. 24, No. 1, Jan. 1988, pp. 683–688.

McEwen, Peter A. and Kenney, John G., "Allpass Forward Equalizer for Decision Feedback Equalization," *IEEE Transactions on Magnetics*, vol. 31, No. 6, Nov. 1995, pp. 3045–3047.

Wood, Roger W. and Donaldson, Robert W., "Decision Feedback Equalization of the DC Null in High–Density Digital Magnetic Recording," *IEEE Transactions on Magnetics*, vol. MAG–14, No. 4, Jul. 1978, pp. 218–222.

*Primary Examiner*—Young T. Tse
*Attorney, Agent, or Firm*—Timothy Rex Croll

[57] ABSTRACT

A signal processing channel and method for reducing intersymbol interference in a sequence of data symbols includes a pre-shaping filter for sharpening leading edges of data symbols and providing trailing edges that approximate a decaying exponential. The output of the pre-shaping filter is combined with a cancellation output from a resistance-capacitance circuit having a time constant selected to provide pulse responses that complement the exponentially decaying trailing edges. The combination of the shaped output and the cancellation output is input to a slicer or other decision device. The 2-level output from the slicer is an input to a decision feedback filter that generates the cancellation output. In addition to the resistance-capacitance circuit, the decision feedback filter includes a delay to properly time the coincidence of the cancellation output with the shaped output from the pre-shaping filter. Preferably, the signal processing channel and method include a gain circuit for setting the peaks of the shaped signals and include adaptive adjustment of the gain, the sharpening by the pre-shaping filter, and the RC time constant of the decision feedback filter.

20 Claims, 6 Drawing Sheets

INTERSYMBOL INTERFERENCE CANCELLATION WITH REDUCED COMPLEXITY

TECHNICAL FIELD

The invention relates generally to signal processing channels and methods, and more particularly to reducing intersymbol interference and minimizing the effects of noise during reading of digital data from a magnetic recording medium.

BACKGROUND ART

In signal processing systems, such as those employed with magnetic recording devices, digital data are encoded into a series of symbols. For digital magnetic recording, readback symbols ideally have a limited number of amplitudes, e.g., −1, 0 and +1, at sample instants. However, all channels have non-ideal characteristics which cause various forms of distortions. One type of distortion is referred to as "intersymbol interference" (ISI). ISI is the extension of a data symbol into preceding and/or following symbol intervals.

Magnetic transitions on a magnetic recording medium may be sufficiently spaced apart to prevent errors due to ISI. However, the trend is clearly toward increasing the linear density of data on a medium. As a consequence, the limited high frequency response of the readback channel potentially results in a considerable amount of ISI.

There are methods of compensating for ISI. One such method is to pass the readback signal through an equalizer that restores high frequency components of the desired signal. However, restoring the high frequency components typically boosts the high frequency noise, so that the error rate is increased. Another method of reducing ISI to an acceptable level is to use decision feedback equalization (DFE). The readback channel response may be shaped such that leading ISI is reduced to an acceptable level and the preponderance of ISI caused by a particular data symbol occurs following the data symbol. As a result, the boost of high frequency noise can be reduced relative to conventional equalization. If the trailing ISI is known, it can be subtracted from the incoming signal. Consequently, this approach to reducing ISI requires significant circuitry. For example, a partial response-maximum likelihood (PRML) circuit typically includes precisely adjusted continuous-time filters with multiple poles and zeroes, an analog-to-digital converter and a digital signal processor that operates on digitized samples of the input signal. The use of this approach becomes increasingly difficult as demand is made for higher data rates, lower power consumption, and more efficient use of integrated circuit chip real estate.

U.S. Pat. No. 4,953,041 to Huber provides greater detail in the description of known approaches. The patent asserts that most "conventional" digital magnetic recording systems differentiate a readback signal in order to convert waveform amplitude peaks into zero-crossings. A differentiator-based peak detection channel may include a first equalizer that includes pulse slimming filters to narrow both the leading and the trailing edges of a Lorentzian input pulse. The pulse slimming is achieved through the addition and subtraction of signal-derived compensation pulses. Following equalization, the readback signal is differentiated, limited and then inverted in order to fully recover the representative digital data. The Huber patent contends that a difficulty with the symmetrical pulse slimming is that it increases the bandwidth of the read pulses, requiring a corresponding increase in the read system bandwidth. The larger bandwidth introduces more noise into the system, degrading the signal-to-noise ratio of the channel. The increase in system noise frequently translates into large amounts of peak jitter, due to ISI, causing significant reduction in the achievable window margin in magnetic media storage systems.

The Huber system is designed to overcome the difficulties of the "conventiona" digital magnetic recording systems by utilizing a forward filter that produces an isolated readback pulse that is characterized by a slimmed rising edge and a slurred falling edge. The shaped pulse is input to a comparator that produces a step response when an input threshold is exceeded by the slimmed rising edge of the pulse. A quantized feedback filter receives the step response output of the comparator and produces a compensating waveform that is substantially complementary to the slurred falling edge of the forward filter output. The output of the quantized feedback filter is summed with the output of the forward filter, producing an equalized signal that is substantially a step function.

While the Huber system provides some improvement over the prior systems, it does not fully address the concern of reducing power consumption by equalization circuitry of a digital magnetic recording system. Moreover, a more efficient use of chip real estate is desirable.

What is needed is a signal processing channel and method for reducing intersymbol interference in a manner that reduces complexity such that a reduction in consumption of power and chip real estate is realized.

SUMMARY OF THE INVENTION

A signal processing channel and method for reducing intersymbol interference includes pre-shaping data symbols received at a channel input such that the leading edges of the symbols are sharpened and the trailing edges have increased amplitude-transition times that approximate a decaying exponential curve. A low-complexity decision feedback filter whose impulse response is a delayed exponential decay may then be used to generate pulse responses that combine with the trailing edges of the data symbols in a manner to significantly reduce the trailing intersymbol interference. Thus, the pulse pre-shaping locates the ISI predominantly at the trailing edges, where a feedback filter consisting of a delay and a resistance-capacitance circuit subtracts a significant portion of the ISI.

In the preferred embodiment, the pre-shaping is accomplished by means of an allpass filter. The allpass filter is a forward equalizer that sharpens, i.e. edge enhances, the leading edges of data symbols without accentuating high frequency components of the input signal. Preferably, the allpass filter includes continuous-time adaptability.

As one alternative to the allpass filter, the pre-shaping can be accomplished by means of subtracting a portion of the derivative of the input signal from the input signal itself. The subtraction of the derivative decreases the amplitude-transition times at the leading edges of data symbols and increases the amplitude-transition times at the trailing edges. However, unlike an allpass filter, the derivative subtraction accentuates high frequency noise.

The shaped-symbol signal is then passed through a summing junction to a decision component, such as a slicer, for generating a 2-level output in response to the shaped data symbols. The 2-level output is conducted to downstream processing circuitry, but also provides an input to the decision feedback filter for generating the delayed exponential decay response. The length of the delay is selected to provide coincidence of the trailing ISI of the shaped-symbol signal with exponential decay responses of the decision feedback filter. For example, reading a 1,7 code may require a fixed delay of one code bit time.

The decision feedback filter also includes the resistance-capacitance (RC) circuit having an RC time constant that defines the exponential delay response. In its simplest form, the RC time constant is established by a single fixed resistor and a single fixed capacitor. However, the preferred embodiment is one in which the RC circuit is adaptive. The RC circuit establishes a first order response for matching trailing intersymbol interference. A second order response may be implemented either by also including an inductance or an additional RC circuit, so as to better match the trailing ISI.

The delayed response from the RC circuit is combined with the shaped-symbol output from the preshaping filter. This combination of outputs from the two filters occurs at the summing junction prior to input to the decision component.

Implementation of the signal processing channel and method is optimized when the amplitude and shape of the cancellation output from the decision feedback filter are a complementary match with the shaped-symbol output from the first filter. Consequently, at least three adjustments are preferably available. Firstly, symbol amplitude at the summing junction is preferably adaptive. Secondly, the boost at the pre-shaping filter is adaptive. Moreover, the resistance-capacitance circuit of the decision feedback filter is preferably adjustable in order to control the shape of the exponential delay response. Another possibility is to use a delay that is adaptively adjustable. Ideally, the adjustments are non-interacting. However, if there is partial interaction among the various adjustments, each adjustment should be made at a time when error detection is least affected by the other adjustable parameters.

An advantage of the invention is that it provides a significant reduction in terms of power and chip real estate consumption. Computer simulations of the signal processing channel indicate removal of a substantial degree of intersymbol interference. As a result, a high data density is available for magnetic readback operations. Another advantage is that the decrease in complexity does not prevent the use of automatic tuning. BRIEF DESCRIPTION OF THE DRAWINGS FIG. 1 is a block diagram of a magnetic disk read/write assembly that allows ISI cancellation in accordance with the invention.

BEST MODE FOR CARRYING OUT THE INVENTION

Figure 1:
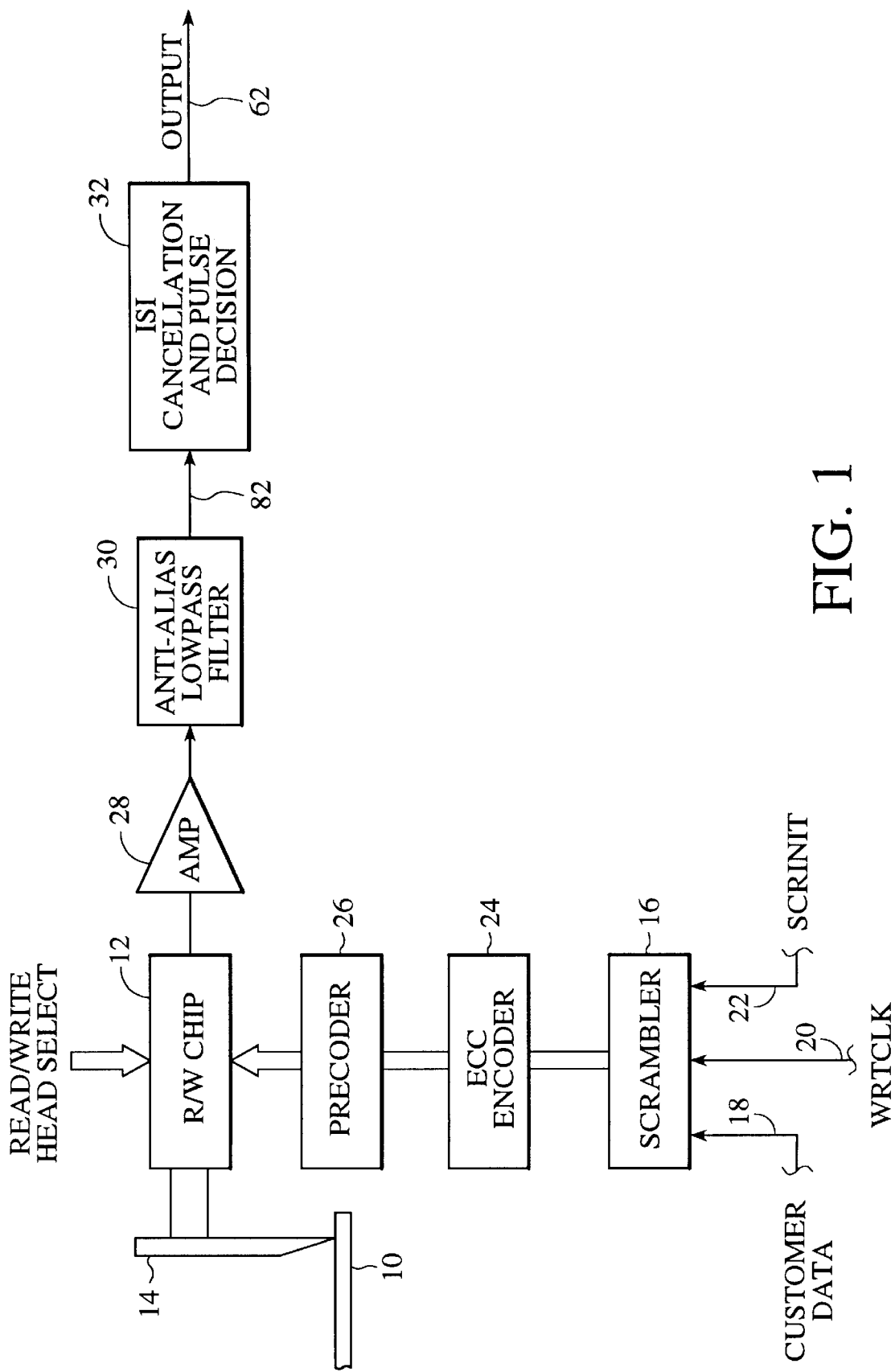

With reference to FIG. 1, a magnetic recording device is shown for reading and writing data on a magnetic disk 10. The device includes a standard read/write integrated circuit chip 12 that is connected to an inductive head 14. In a writing mode, a scrambler 16 receives a customer data input 18, a write clock input 20, and resets 22 in order to output scrambled data to be written on a sector of the magnetic disk. The scrambler may process the customer data with a pseudo-random sequence prior to writing user-information data on the disk.

Error correction code (ECC) encoding is performed at block 24 after the scrambling, so as to avoid error propagation in subsequent descrambling. Pre-coding occurs at block 26 for the writing of data onto the magnetic disk 10. For example, the polarity of writing current may be based upon whether a "1" or a "0" is at the output of the pre-coder 26.

In a read operation, a magnetic transition on the disk 10 will cause the read/write head 14 to generate a data symbol, or transition response, which is then input to an amplifier 28. Following amplification, the sequence of data symbols is received at an anti-aliasing filter 30. The operation of the read/write chip 12, the amplifier 28 and the anti-aliasing filter 30 is well known in the art. The circuitry that is represented by the elements 12, 28 and 30 in FIG. 1 may be varied, and to a degree eliminated, without affecting the operation of the invention.

Figure 2:
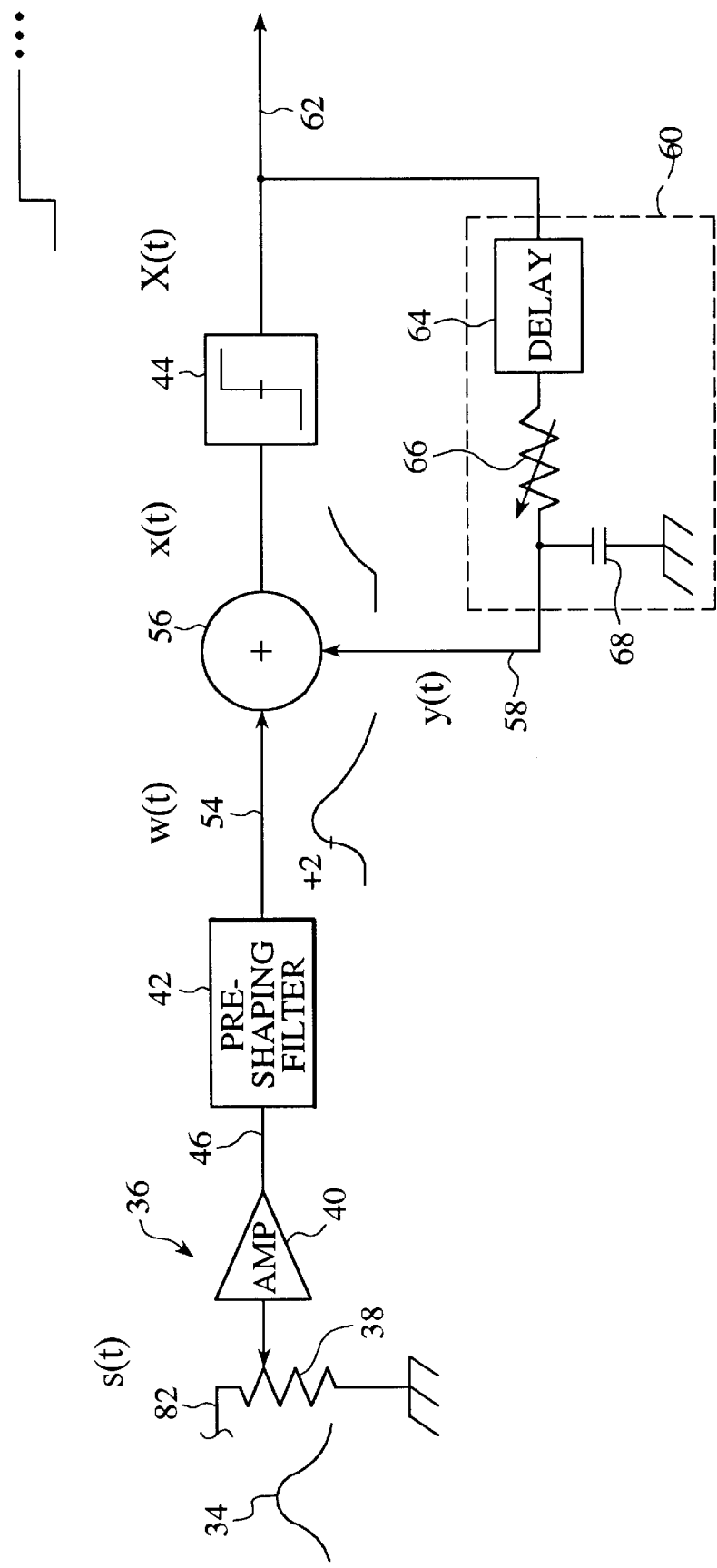
FIG. 2 is a block diagram of pulse-in-and-step-out circuitry for ISI cancellation in accordance with the invention.

The readback signal processing channel of FIG. 1 also includes an ISI cancellation and pulse decision circuit 32. The components of the circuit are identified in FIG. 2. A normally symmetrical Lorentzian response 34 is shown as an isolated input (s) to an adaptive gain circuit 36. The gain circuit includes a variable resistance 38 and an amplifier 40. In the embodiment of FIG. 2, the gain is preferably adjusted so that isolated positive-going and negative-going data symbols have peaks of +2 V and −2 V following output (w) from a pre-shaping filter 42. Adaptive adjustment of the gain circuit 36 will be described in detail below.

The purpose of the pre-shaping filter 42 is to shape the readback signal such that ISI is predominantly a trailing phenomenon. This is accomplished by sharpening the leading edges of data symbols and allowing the trailing edges to increase in transition time. "Sharpening" will be described herein as a decrease in the amplitude-transition time of a data symbol, i.e., edge enhancement. By sharpening the leading edges of the data symbols, a decision device 44 more reliably detects the leading edge transitions.

Figure 3:
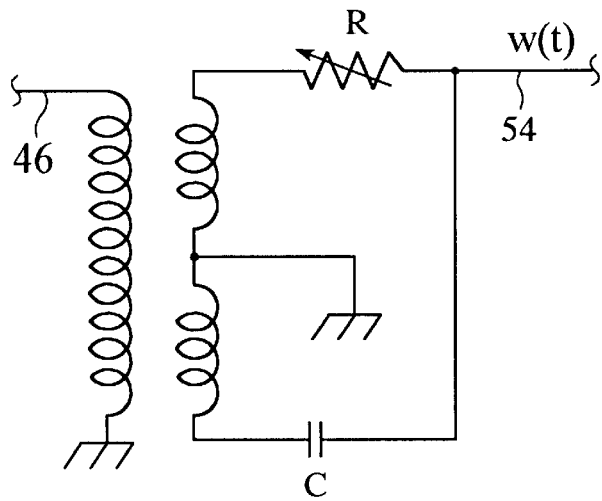
FIG. 3 is a schematical representation of an allpass filter as a first embodiment of the pre-shaping filter of FIG. 2.

The pre-shaping at filter 42 may be accomplished in a number of ways. In the preferred embodiment, the pre-shaping filter is an adaptive allpass filter, such as the one in FIG. 3 that includes a transformer having a center-tapped secondary. The allpass filter has the following complex frequency response:

$$Ha(f) = \frac{1 - j \cdot 2 \cdot \pi \cdot \tau a \cdot f}{1 + j \cdot 2 \cdot \pi \cdot \tau a \cdot f}$$

where $\tau a = RC$. The filter has a frequency dependent phase shift, as determined by $$\phi(f) = -2 \cdot \arctan(2 \cdot \pi \cdot \tau a \cdot f).$$

Consequently, the allpass filter shifts the peaks of the Fourier components of a data symbol in time such that the leading edge of the data symbol is sharpened, while the trailing edge has a reduced slope. The peak of the data symbol is also time shifted. An advantage of the allpass filter is that its operation does not create significant noise enhancement. That is, as compared to alternative pre-shaping filters, high frequency noise is not accentuated. An acceptable allpass filter is described by P. McEwen and J. Kenney in "Allpass Forward Equalizer for Decision Feedback Equalization," *IEEE Transactions on Magnetics*, Vol. 31, No. 6, Nov. 1995. While the allpass filter is the preferred embodiment for implementing the pre-shaping, other equalization techniques may be used. In order to provide an implementation in which power and chip real estate are efficiently used and complexity is not required, a continuous time equalization is preferred.

Figure 4:
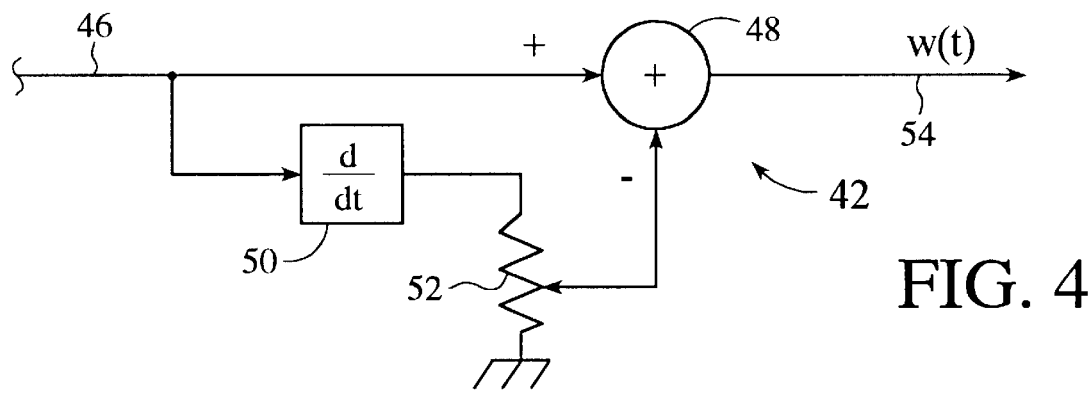
FIG. 4 is a schematical representation of a derivative-subtraction circuit as a second embodiment of the pre-shaping filter of FIG. 2.

FIG. 4 illustrates another acceptable embodiment of the pre-shaping filter 42. In this embodiment, the signal along line 46 from the adaptive gain circuit 36 provides an input to a summing junction 48 and circuitry 50 for determining the derivative of the signal. The output of the derivative circuitry 50 is conducted to a variable resistance 52. The adjustment of the resistance determines the amount of derivative that is subtracted at the summing junction 48. As will be explained more fully below, the variable resistance 52 represents an adaptive boost.

The output (w) from the pre-shaping filter 42 of FIG. 2 is conducted along line 54 to a summing junction 56. A second input 58 to the summing junction 56 is an output (y) from a decision feedback filter 60. The decision feedback filter is used to cancel the trailing ISI from the pre-shaped readback signal. The summation (x) of signals from the summing junction 56 is input to the decision device 44 that forms a 2-level output (x) along line 62. The 2-level output is responsive to the data symbols input to the decision device. The operation of the decision device is well known in the art. One implementation of the device is referred to as a slicer, or zero-crossing circuit. The output at line 62 in FIG. 2 may have values of +1V and -IV, but other outputs may be generated while staying within the scope of the invention.

The decision feedback filter 60 of FIG. 2 includes a delay 64, a variable resistance 66, and a capacitance 68. The delay 64 is a digital delay element that is selected to ensure that the feedback filter output on line 58 properly coincides with the readback signal along line 54. The resistance and capacitance of the feedback filter are selected to achieve a desired exponential delay curve for cancellation of ISI. The shape at trailing edges of data symbols following shaping at the first filter 42 approximates a decaying exponential. Consequently, by providing a decision feedback filter 60 that utilizes a small number of components to provide a cancellation output (y) that is the complement of trailing ISI, complexity is reduced without a corresponding reduction in performance. Moreover, the reduction in demand for integrated circuit chip real estate is significant, compared to prior art decision feedback filters.

Figure 5:
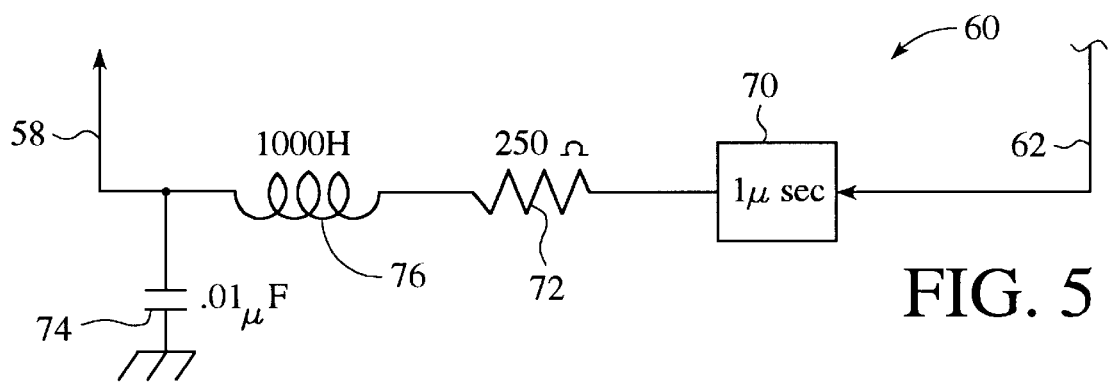
FIG. 5 is a schematical representation of a first embodiment of the decision feedback filter of FIG. 2.

An implementation of the decision filter 60 is shown in FIG. 5. The circuit could be utilized in a system in which a 1,7 code is used to write user information by means of an inductive head on a conventional quarter-inch cartridge (QIC) at 0.75 meters/sec, i.e. QIC-80 cartridge. The PW50 may be 3 psec, with no write equalization. The code bit time would then be 1 $\mu$sec, giving a data symbol time of 2×¾=3⁄2 $\mu$sec and a density ratio of 2.0. The digital delay element 70 of FIG. 5 is 1 82 sec. The values of the resistor member 72, the capacitor member 74 and an inductor member 76 are selected to provide a time constant Q =0.4. In its simplest form, the decision feedback filter 60 does not include the inductor member 76. However, the inductance provides a second order response that achieves a better match to the trailing ISI, as compared to the single order response of a resistance-capacitance circuit.

Figure 6:
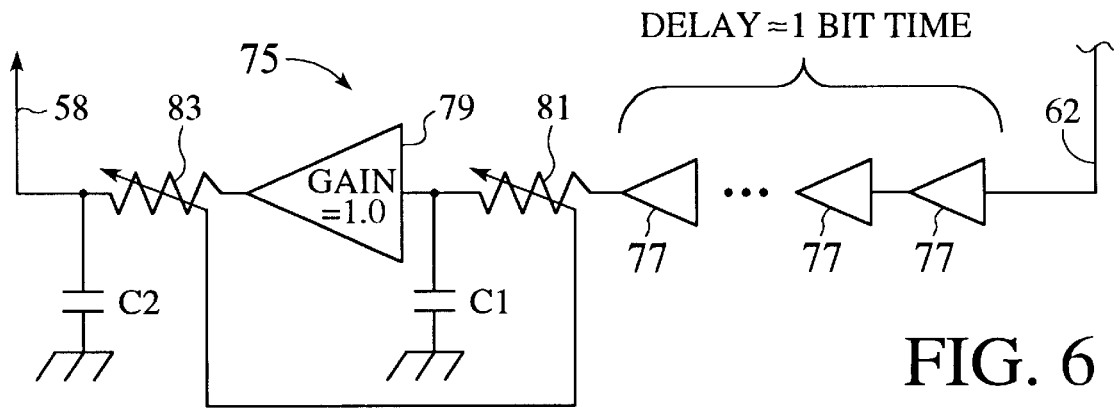
FIG. 6 is a schematical representation of a second embodiment of the decision feedback filter of FIG. 2.

An alternative embodiment of a decision feedback filter 75 that achieves second order response is shown in FIG. 6. Digital elements 77 provide a delay of approximately one bit time. A unity gain member 79 links two RC lowpass circuits having ganged variable resistances 81 and 83. The second response is established by the operations of the tandem RC circuits.

The operation of the channel of FIG. 2 will be described with reference to a pair of data symbols 78 and 80 in FIG. 7. These symbols are received at the input (s) 82 of FIG. 2. The symbols are potentially amplified at the adaptive gain circuit 36 and are shaped at the filter 42, providing the shaped data symbols 84 and 86. The linear equalization filter 42 converts symmetrical Lorentzian symbols into symbols with predominantly trailing ISI. The trailing edges of the symbols are well matched by a decaying exponential. The decision feedback filter 60 is designed to take advantage of the approximation of the trailing ISI to a decaying exponential.

The input (x) to the decision device 44 is a combination of the shaped readback signal (w) at line 54 with the cancellation output (y) from line 58. The cancellation output 88 of FIG. 7 provides the decision input 90 when combined with the shaped data symbols 84 and 86. As a result, the decision output (x) 92 is less susceptible to error induced by ISI. The delay Td represented in FIG. 7 is a result of the digital delay element 64 in FIG. 2. This delay plays an important role in establishing the desired temporal relationship between arrival of the symbols 84 and 86 with the arrival of the cancellation output 88 at the summing junction 56. The charge and discharge of the resistance-capacitance circuit of the decision feedback filter 60 defines the leading and trailing slopes of the cancellation output 88 of FIG. 7.

Figure 7:
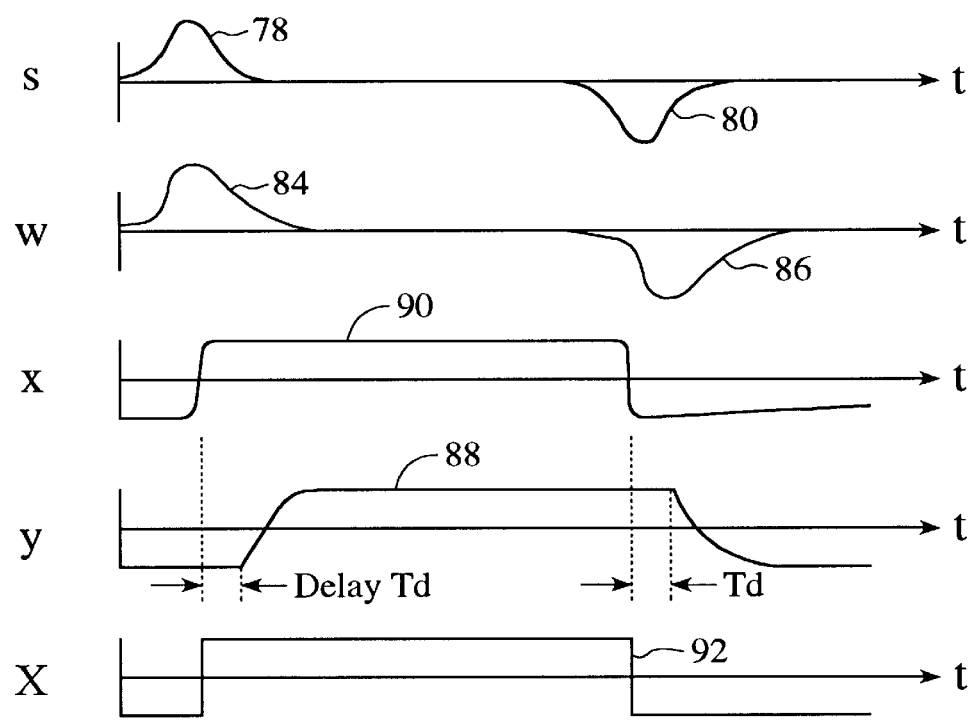
FIG. 7 is an illustration of waveforms at various nodes of the circuitry of FIG. 2 when data symbols are sufficiently spaced apart.
Figure 8:
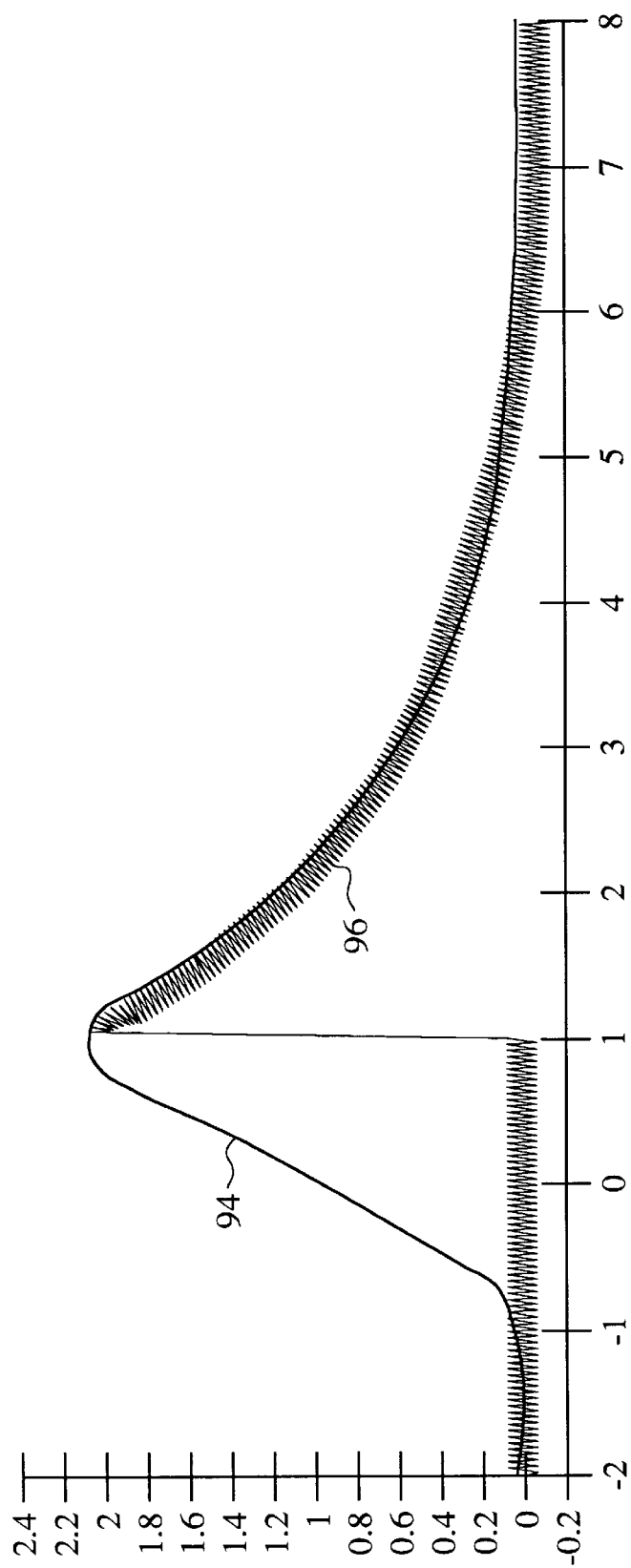
FIG. 8 is an illustration of a match between trailing ISI of a data symbol and a delayed pulse response of the decision feedback filter of FIG. 2.

FIG. 8 is an illustration of matching trailing ISI to the decaying exponential curve established by the resistance-capacitance circuit. The solid line 94 represents an isolated, positive-going data symbol. The alternating line 96 is a discharge of the RC circuit. The discharge closely approximates the trailing ISI. The RC time constant may be empirically set, but preferably is adaptively determined, as will be described more fully below. The delay of the decision feedback filter is set at 1 $\mu$sec. The delay depends upon a number of factors, including the code, the data rate, and the width of the unfiltered pulses 78 and 80 of FIG. 7.

Figure 9:
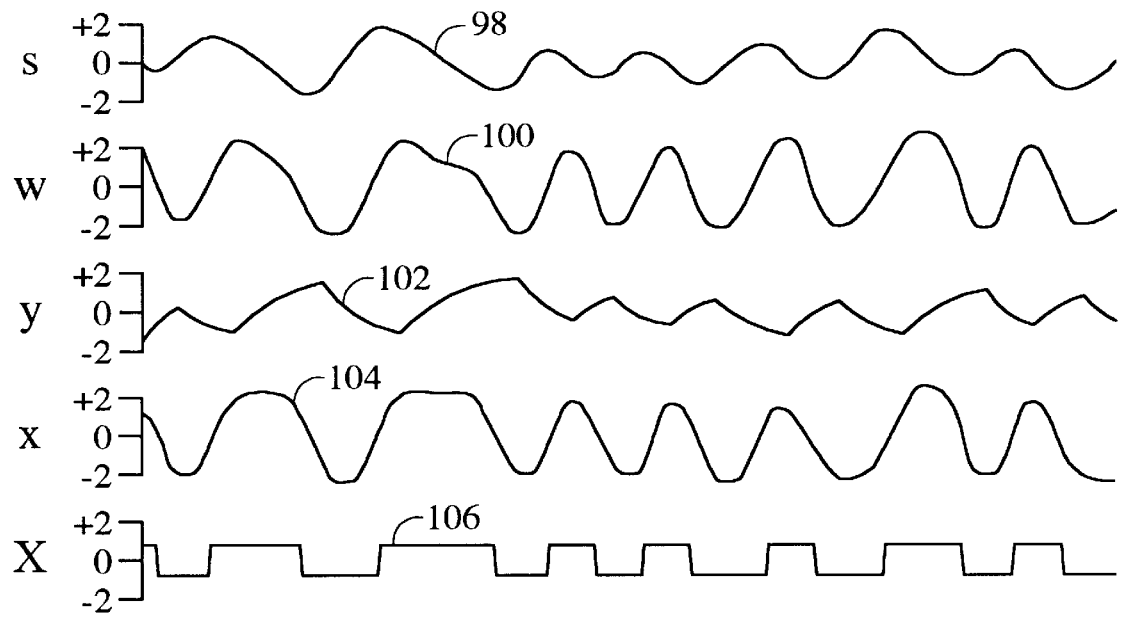
FIG. 9 is an illustration of waveforms at various nodes of the circuitry of FIG. 2 when data symbols are closely spaced.

The various signals that are generated when the input signal comprises closely-spaced data symbols are shown in FIG. 9. The input signal (s) 98 is received at line 82 in FIG. 2. The input signal 98 is amplified at the adaptive gain circuit 36 and the data symbols are shaped at the equalization filter 42 such that the ISI is predominantly trailing ISI. The shaped output (w) 100 is one input to the summing junction 56. The other input (y) is the cancellation output 102 from the decision feedback filter 60. The RC time constant of the decision feedback filter defines the charge and discharge parameters of the cancellation output.

The combination of the shaped output 100 and the cancellation output 102 provides the input signal (x) 104 to the decision device 44. Note that the trailing ISI is substantially cancelled by the cancellation. Consequently, the 2-level output (X) 106 is less susceptible to error caused by ISI.

The digital delay element 64 of FIG. 2, which only has the delay logic level signals, may be a simple asynchronous delay, such as a series of IC buffers. Alternatively, the delay may be derived synchronously, such as by means of a clock and a D flip-flop. An advantage of using the asynchronous delay is that the circuit is more robust, since a clock recovery phase-locked loop would not be required for proper operation. On the other hand, the synchronous delay would include less jitter, since it would be based upon a clock having a phase that is averaged over several bit times. Performance of the circuit may be improved by providing asynchronous delay for the initial lock-up and synchronous delay in the data field.

A technique similar to that described above may be used for cancelling ISI in a signal generated by a yoke head. The main difference is that the decision feedback filter 60 would be a high-pass RC filter, rather than a low-pass filter. In this embodiment, the delay element could be deleted.

As previously noted, the readback channel preferably includes adaptive adjustments of the gain circuit 36, the pre-shaping filter 42 and the RC time constant of the decision feedback filter 60. The adjustments ideally are non-interacting, but partial interaction is acceptable. Adjustment of the gain circuit could then take place at a time when the generation of an error signal is least affected by the pulse response of the feedback filter 60 and the pre-shaping that occurs at filter 42. The selection of timing to execute adjustments applies equally to the pre-shaping filter 42 and the feedback filter 60.

Figure 10:
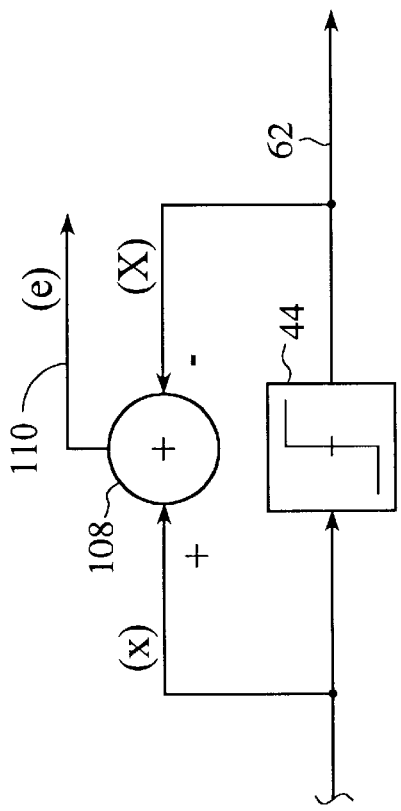
FIG. 10 is a schematical representation of error detection for adjusting various components of the circuitry of FIG. 2.

Error detection may be performed in the uncomplex manner illustrated in FIG. 10. The input signal (x) to the decision device 44 may be compared to the 2-level output (X) at a summing junction 108. This comparison generates an error signal (e) at line 110. If at a selected gain-adjustment time the difference between the signals (x—X) is greater than anticipated, the error signal at line 110 may be used to reduce amplification at the gain circuit 36. On the other hand, if the signal difference (x—X) is less than the desired difference, the error signal will initiate an increase in the amplification at the gain circuit.

Gain adjustment may be performed to coincide with peaks of data symbols. On the other hand, adjustment of the time constant of the decision feedback filter 60 may take place following data symbol peaks. Referring briefly to FIG. 7, ideally the signals x and X have coinciding high states. By sampling the difference between the two signal inputs to the summing junction 108 during the charge time for the RC circuit that generates the cancellation output 88, it can be determined whether the RC time constant is properly set. The RC time constant can be adjusted upwardly and downwardly in response to the polarity and magnitude of the error signal along line 110.

The adjustment of the pre-shaping filter 42 may occur during the rise time of a positive-going data symbol, such as symbol 84 in FIG. 7. The pre-shaping filter sharpens the leading edges of data symbols. Consequently, the pre-shaping filter determines the rise time of the pulse of the signal 90. By comparing the signals x and X during a rise time, an error signal can be generated to determine pre-shaping adjustment.

Figure 11:
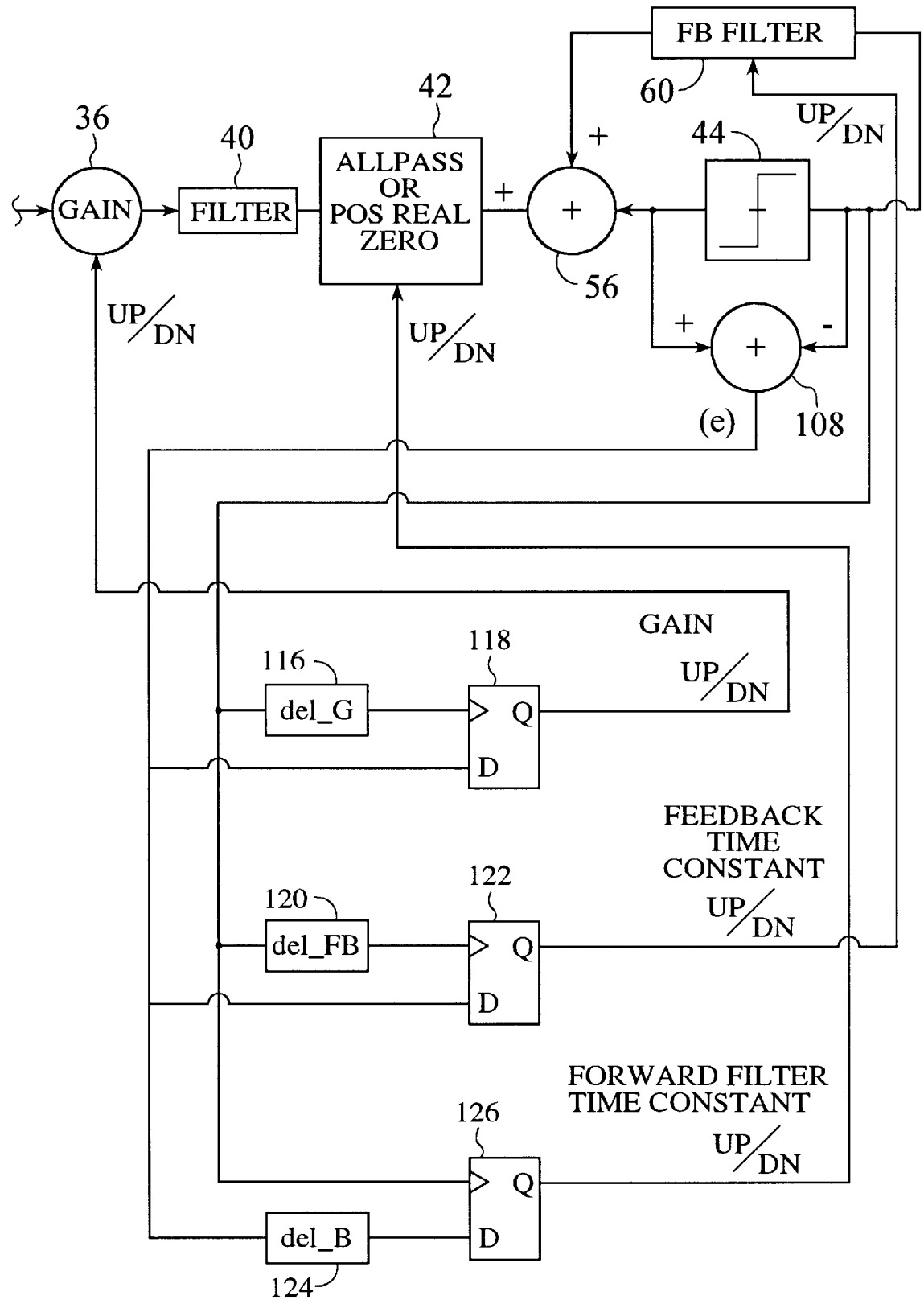
FIG. 11 is a schematical representation of circuitry for providing dynamic error correction for the adjustable components of FIG. 2.

FIG. 11 illustrates a circuit that permits dynamic adjustment of the gain at circuit 36, the boost at the forward filter 42, and the RC time constant at the feedback filter 60. As described with reference to FIG. 10, the signals X and x are input to the summing junction 108. The difference between the two signals is the error signal (e) that is input to a pair of flip-flops 118 and 122 and to a delay element 124. The delayed error signal from delay element 124 is input to a third flip-flop 126.

The 2-level output X from the decision device 44 is connected to a pair of delay elements 116 and 120. The delayed 2-level signal is input to the first and second flip-flops 118 and 122. A direct connection is made from the output of the decision device 44 to the third flip-flop 126.

The outputs of the three flip-flops 118, 122 and 126 determine whether the associated circuits should be incremented upwardly or downwardly. The output from element 118 is connected to the gain circuit 36. This output instructs the gain circuit to either increment upwardly or downwardly. In like manner, the element 122 provides an adjustment of the RC circuit of the decision feedback filter 60, thus incrementally adjusting the time constant of the filter. The adaptive circuitry of the pre-shaping filter 42 is connected to the output of element 126 to allow incremental changes in response to detection of error.

The invention of FIGS. 1–11 has been described and illustrated for use primarily in the magnetic recording industry. However, other applications of the signal processing channel are contemplated, e.g., digital communication.

What is claimed is:

1. A signal processing channel for reducing intersymbol interference in a sequence of data symbols comprising:

a channel input;

pre-shaping means connected to said channel input for decreasing amplitude-transition times at leading edges of data symbols received at said channel input and for increasing amplitude-transition times at trailing edges of said data symbols, thereby sharpening said leading edges of data symbols within a shaped output of said pre-shaping means;

decision means, connected to said pre-shaping means, for generating a 2-level output in response to said data symbols; and an exponential decay feedback filter for cancelling exponential decay at said trailing edges of said data symbols within said shaped output prior to input of said data symbols to said decision means, said feedback filter having an input connected to receive said 2-level output and having a cancellation output connected between said pre-shaping means and said decision means to combine said cancellation output with said shaped output, said feedback filter having a resistance-capacitance circuit to define said exponential decay cancellation and having a delay to determine timing of introducing said exponential decay cancellation to said shaped output of said pre-shaping means.

2. The channel of claim 1 wherein said pre-shaping means is an allpass filter connected to said channel input to provide continuous-time feedforward equalization.

3. The channel of claim 1 wherein said pre-shaping means includes circuitry for receiving an input signal via said channel input and for subtracting a derivative of said input signal from said input signal, said circuitry being connected to provide continuous time subtracting of said derivative.

4. The channel of claim 1 wherein said pre-shaping means has an impulse response such that said trailing edges of said data symbols are shaped to approximate a decaying exponential curve, said resistance-capacitance circuit of said feedback filter having an RC time constant selected to approximate said decaying exponential curve.

5. The channel of claim 4 further comprising means for adaptively adjusting said RC time constant.

6. The channel of claim 5 wherein said means for adaptively adjusting includes a circuit connected across said decision means, said circuit having an error output responsive to a difference between an input of said decision means and said 2-level output of said decision means.

7. The channel of claim 5 wherein said circuit is connected to further provide adaptive adjustment of said pre-shaping means to vary said amplitude-transition times at said leading and trailing edges.

8. The channel of claim 1 wherein said channel input is connected to receive read signals from a read head of a magnetic recording device.

9. The channel of claim 1 wherein said channel input is connected to digital communication equipment.

10. The channel of claim 1 further comprising gain means for adaptively determining amplitude of said data symbols within said shaped output of said pre-shaping means.

11. A transmission path for reducing intersymbol interference in a digital magnetic recording readback signal comprising:

feedforward equalization means for shaping said readback signal to include readback symbols having sharp leading edges and having trailing edges that approximate exponential decay;

a summer connected to receive an output of said feedforward equalization means;

a slicer connected to an output of said summer for forming a 2-level output responsive to said readback symbols of said readback signal; and a feedback filter having an input connected to receive said 2-level output, said feedback filter including an RC circuit having a time constant selected to provide pulse responses at said summer for combination with said output of said feedforward equalization means to complement said exponentially decaying trailing edges, said feedback filter further including a delay selected to establish coincidence of said pulse responses and said exponentially decaying trailing edges.

12. The transmission path of claim 11 wherein said delay of said feedback filter is a delay circuit that introduces a fixed delay in a 2-level signal.

13. The transmission path of claim 11 wherein said time constant of said RC circuit is adaptively adjustable to vary said pulse responses to more closely approximate said exponentially decaying trailing edges.

14. The transmission path of claim 11 wherein said RC circuit includes a resistive member and a capacitive member connected between said slicer and said summer, with one of said resistive and capacitive members being connected to electrical ground.

15. The transmission path of claim 14 wherein said RC circuit further includes an inductance member to provide a second order response to said pulse responses for closer approximations to said exponentially decaying trailing edges.

16. The transmission path of claim 14 further comprising a second RC circuit connected in tandem to said RC circuit and having ganged adjustments to provide a second order response to said pulse responses.

17. A method of reducing intersymbol interference in a digital magnetic recording readback signal comprising steps of:

reading data from a magnetic recording medium to form a sequence of data symbols;

filtering said sequence of data symbols such that intersymbol interference is shifted predominantly to trailing edges of said data symbols, including reshaping leading edges of said data symbols to have enhanced slopes and including reshaping said trailing edges to have slopes approximating a decaying exponential curvature; and introducing a cancelling signal to said sequence of reshaped data symbols such that said intersymbol interference at said trailing edges is reduced, including decision-feedback filtering a 2-level output that is at least partially responsive to said sequence of data symbols, said decision-feedback filtering including establishing a resistance-capacitance circuit that provides a response to said reshaped data symbols such that said response approximates a signal for cancelling said decaying exponential curvature of said trailing edges, said decision-feedback filtering further including introducing a delay selected to determine coincidence between said response of said resistance-capacitance circuit and said sequence of reshaped data symbols.

18. The method of claim 17 further comprising inputting a combination of said cancelling signal and said sequence of reshaped data symbols into a slicer for forming said 2-level output that is decision-feedback filtered by said resistance-capacitance circuit.

19. The method of claim 17 further including adaptively adjusting an RC time constant of said resistance-capacitance circuit in response to an error signal, thereby changing said response of said resistance-capacitance circuit.

20. The method of claim 17 wherein said step of filtering said sequence of data symbols is a step of providing linear equalization.

* * * * *